United States Patent
Henderson et al.

(10) Patent No.: US 6,868,386 B1
(45) Date of Patent: *Mar. 15, 2005

(54) MONITORING SYSTEM FOR DETERMINING AND COMMUNICATING A COST OF INSURANCE

(75) Inventors: Maria Henderson, Tampa, FL (US); Robert J. McMillan, Colorado Springs, CO (US); Alexander D. Craig, Moreland Hills, OH (US); John P. Heinen, Tampa, FL (US); Byron J. Olexa, Mentor-on-the-Lake, OH (US); Mark C. McElroy, South Euclid, OH (US); Robert S. Lee, Hudson, OH (US)

(73) Assignee: Progressive Casualty Insurance Company, Mayfield Village, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/571,650

(22) Filed: May 15, 2000

Related U.S. Application Data

(63) Continuation-in-part of application No. 09/135,034, filed on Aug. 17, 1998, now Pat. No. 6,064,970, which is a continuation of application No. 08/592,958, filed on Jan. 29, 1996, now Pat. No. 5,797,134.

(51) Int. Cl.$^7$ .............................................. G06F 17/60
(52) U.S. Cl. ........................... 705/4; 340/439; 705/400
(58) Field of Search ........................... 340/439, 870.01; 360/5; 705/4, 400

(56) References Cited

U.S. PATENT DOCUMENTS

| | | | |
|---|---|---|---|
| 3,504,337 A | 3/1970 | Ekman | 340/439 |
| 4,067,061 A | 1/1978 | Juhasz | 360/5 |

(List continued on next page.)

FOREIGN PATENT DOCUMENTS

| | | |
|---|---|---|
| EP | 0 700 009 A2 | 3/1996 |
| EP | 935208 A2 | 11/1999 |
| FR | 2 533 049 | 3/1984 |
| GB | 2 143 978 A | 2/1985 |
| GB | 2 225 461 A | 5/1990 |
| JP | 4-182868 | 6/1992 |
| JP | 6-4733 | 1/1994 |
| JP | 6-259632 | 9/1994 |
| JP | 7-159192 | 6/1995 |
| WO | 9/002388 | 8/1989 |
| WO | WO 97/27561 A1 * | 7/1997 |
| WO | WO 200052616 A2 | 9/2000 |

OTHER PUBLICATIONS

Pasher, Auto Web site takes off, Mar. 1998, National Underwater (Property & Casualty/Risk & Benefits Management), vol. 102 No. 11, pp. 9 and 16.

Festa, For Insurance Sales, Turn to the 'Web', Aug. 1995, Insurance Regulator, vol. 5, No. 31, p. 1.

Business Editors, Electric Insurance Joins Intuit's Quicken InsureMarket Offering Online Auto Policies in 6 States, Dec. 1998, Business Wire.

(List continued on next page.)

Primary Examiner—Edward Cosimano
(74) Attorney, Agent, or Firm—Fay, Sharpe, Fagan, Minnich & McKee, LLP

(57) ABSTRACT

A method and system for communicating insurance related services between an insured and an insurer through an Internet communication scheme includes a processing system for processing acquired event and sensored data to compute the cost of insurance for the same period as the data is acquired. An enhanced Internet communication scheme provides an insured access to the acquired data and its processing through enhanced presentation systems (e.g., maps with usage, service or special event processing or even automobile service diagnostics.) In addition, communication packages can provide estimates based upon user-supplied information identifying projected usages.

17 Claims, 6 Drawing Sheets

U.S. PATENT DOCUMENTS

| | | |
|---|---|---|
| 4,234,926 A | 11/1980 | Wallace et al. ............. 702/188 |
| 4,258,421 A | 3/1981 | Juhasz et al. ................. 701/35 |
| 4,533,962 A | 8/1985 | Decker et al. ................. 360/5 |
| 4,608,638 A | 8/1986 | Tsikos ........................ 364/424 |
| 4,638,295 A | 1/1987 | Middlebrook et al. ...... 340/465 |
| 4,667,336 A | 5/1987 | Best ............................ 377/15 |
| 4,745,564 A | 5/1988 | Tennes et al. .............. 702/141 |
| 4,763,745 A | 8/1988 | Eto et al. .................... 180/143 |
| 4,807,179 A | 2/1989 | Clere et al. ................. 360/5 X |
| 4,829,434 A | 5/1989 | Karmel et al. ............ 74/866 X |
| 4,831,526 A | 5/1989 | Luchs et al. ................ 364/401 |
| 4,843,463 A | 6/1989 | Michetti ..................... 358/108 |
| 4,843,578 A | 6/1989 | Wade .......................... 364/515 |
| 4,853,720 A | 8/1989 | Onari et al. ........... 364/431.07 |
| 4,939,652 A | 7/1990 | Steiner .................. 364/424.04 |
| 4,987,541 A | 1/1991 | Levente et al. ......... 364/424.04 |
| 4,992,943 A | 2/1991 | McCracken ............ 364/424.04 |
| 5,055,851 A | 10/1991 | Sheffer ....................... 342/457 |
| 5,111,289 A | 5/1992 | Lucas et al. ................ 358/108 |
| 5,189,621 A | 2/1993 | Onari et al. ........... 364/431.04 |
| 5,223,844 A | 6/1993 | Mansell et al. ............. 342/357 |
| 5,319,374 A | 6/1994 | Desai et al. ................. 343/387 |
| 5,359,528 A | 10/1994 | Haendel et al. ......... 364/424.04 |
| 5,365,451 A | 11/1994 | Wang et al. ................ 364/449 |
| 5,430,432 A | 7/1995 | Camhi et al. ............... 340/438 |
| 5,499,182 A | 3/1996 | Ousborne .................... 701/35 |
| 5,500,806 A | 3/1996 | Bellin et al. ........... 364/528.33 |
| 5,548,273 A | 8/1996 | Nicol et al. ................. 340/439 |
| 5,550,551 A | 8/1996 | Alesiu ........................ 342/457 |
| 5,638,273 A | 6/1997 | Coiner et al. .......... 364/424.04 |
| 5,694,322 A | 12/1997 | Westerlage et al. ......... 705/417 |
| 5,797,134 A | 8/1998 | McMillan et al. .......... 705/400 |
| 5,845,256 A | 12/1998 | Pescitelli et al. .............. 705/4 |
| 5,956,691 A | 9/1999 | Powers ........................... 705/4 |

OTHER PUBLICATIONS

"The Safest Cars of 91", Baig, Edward U.S. News & World Report v109, n22, p. 71;Dec. 3, 1990.

"Vendor's Spice Up Services", Robert Deierlein, Beverage-World, v109, n1467, p. 82; Jun. 1990.

Rosenberg, Martin; Alexander, Shephen A. , Rate Classification Reform in New Jersey. Best's Review (Prop/Casualty) vo. 92. No. 12, pp. 30–32. Apr. 1992.

Kaneko, Tetsuya; Jovanis, Paul P. Multiday driving patterns and motor carrier accident risk. A disaggregate analysis. Accident Analysis and Prevention, vol. 24, No. 5, pp. 437–456, Jan. 1, 1992.

Jan. 1, 1994 UK: "An Interest In Black Magic—Motor Technology", *Insurance Age*, p. 25.

"The Road Watches You", *The New York Times*, May 3, 1995, Wednesday, Late Edition—Final, p. 23.

\* cited by examiner

MONITORING SYSTEM FOR DETERMINING AND COMMUNICATING A COST OF INSURANCE

This application is a continuation-in-part application of U.S. Ser. No. 09/135,034, filed Aug. 17, 1998, now U.S. Pat. No. 6,064,970 which is a continuation of U.S. Ser. No. 08/592,958, filed Jan. 29, 1996, now U.S. Pat. No. 5,797, 134. A related application is U.S. Ser. No. 09/364,803 filed Jul. 30, 1999.

FIELD OF THE INVENTION

The present invention relates to data acquisition, processing and communicating systems, and particularly to a system for acquiring and handling relevant data for an insured unit of risk for purposes of providing a more accurate determination of cost of insurance for the unit of risk and for communicating or quoting the so determined cost to an owner of the unit of risk. Although the invention has its principal applicability to motor vehicles such as automobiles, the invention is equally applicable to other units of risk such as, without limitation, motorcycles, motor homes, trucks, tractors, vans, buses, boats and other water craft and aircraft. The invention especially relates to a system for monitoring and communicating units of risk operational characteristics and operator actions for implementing the operational characteristics, to obtain increased amounts of data relating to the safety or risk of use for a subject unit, for purposes of providing a more accurate determination of the cost of insurance corresponding to a real time usage of the risk unit, and for making such data and computed costs accessible to a customer or insured or others on hardcopy, over the Internet or by other electronic means for convenient communication. The invention relates to electronic commerce, particularly where insurance and related information is marketed, sold or communicated via the Internet or other interactive network.

BACKGROUND OF THE INVENTION

Conventional methods for determining costs of motor vehicle insurance involve gathering relevant historical data from a personal interview with the applicant for the insurance and by referencing the applicant's public motor vehicle driving record that is maintained by a governmental agency, such as a Bureau of Motor Vehicles. Such data results in a classification of the applicant to a broad actuarial class for which insurance rates are assigned based upon the empirical experience of the insurer. Many factors are relevant to such classification in a particular actuarial class, such as age, sex, marital status, location of residence and driving record.

The current system of insurance creates groupings of vehicles and drivers (actuarial classes) based on the following types of classifications.

Vehicle:

Age;
manufacturer, model; and
value.
Driver:

Age;
sex;
marital status;
driving record (based on government reports),
violations (citations);
at fault accidents; and
place of residence.
Coverage:

Types of losses covered,
liability,
uninsured motorist,
comprehensive, and
collision;
liability limits; and
deductibles.

The classifications, such as age, are further broken into actuarial classes, such as 21 to 24, to develop a unique vehicle insurance cost based on the specific combination of actuarial classes for a particular risk. For example, the following information would produce a unique vehicle insurance cost.

| Vehicle: | |
| --- | --- |
| Age | 1997 (three years old) |
| manufacturer, model | Ford, Explorer XLT |
| value | $18,000. |
| Driver: | |
| Age | 38 years old |
| sex | male |
| marital status | single |
| driving record | |
| (based on government reports) | |
| violations | 1 point (speeding) |
| at fault accidents | 3 points (one at fault accident) |
| place of residence | 33619 (zip code) |
| Coverage: | |
| Types of losses covered | |
| liability | yes |
| uninsured motorist | no |
| comprehensive | yes |
| collision | yes |
| liability limits | $100,000./$300,000./$50,000. |
| deductibles | $500./$500. |

A change to any of this information would result in a different premium being charged, if the change resulted in a different actuarial class for that variable. For instance, a change in the drivers' age from 38 to 39 may not result in a different actuarial class, because 38 and 39 year old people may be in the same actuarial class. However, a change in driver age from 38 to 45 may result in a different premium because of the change in actuarial class.

Current insurance rating systems also provide discounts and surcharges for some types of use of the vehicle, equipment on the vehicle and type of driver. Common surcharges and discounts include:

| Surcharges: |
| --- |
| Business use. |
| Discounts: |
| Safety equipment on the vehicle |
|     airbags, and |
|     antilock brakes; |
| theft control devices |

-continued passive systems (e.g. "The Club"), and
alarm system; and
driver type
good student, and
safe driver (accident free).
group
senior drivers
fleet drivers A principal problem with such conventional insurance determination systems is that much of the data gathered from the applicant in the interview is not verifiable, and even existing public records contain only minimal information, much of which has little relevance towards an assessment of the likelihood of a claim subsequently occurring. In other words, current rating systems are primarily based on past realized losses. None of the data obtained through conventional systems necessarily reliably predicts the manner or safety of future operation of the vehicle. Accordingly, the limited amount of accumulated relevant data and its minimal evidential value towards computation of a fair cost of insurance has generated a long-felt need for an improved system for more reliably and accurately accumulating data having a highly relevant evidential value towards predicting the actual manner of a vehicle's future operation.

Many types of vehicle operating data recording systems have heretofore been suggested for purposes of maintaining an accurate record of certain elements of vehicle operation. Some are suggested for identifying the cause for an accident, others are for more accurately assessing the efficiency of operation. Such systems disclose a variety of conventional techniques for recording vehicle operation data elements in a variety of data recording systems. In addition, it has also been suggested to provide a radio communication link for such information via systems such as a cellular telephone to provide immediate communication of certain types of data elements or to allow a more immediate response in cases such as theft, accident, break-down or emergency. It has even been suggested to detect and record seatbelt usage to assist in determination of the vehicle insurance costs (U.S. Pat. No. 4,667,336).

The various forms and types of vehicle operating data acquisition and recordal systems that have heretofore been suggested and employed have met with varying degrees of success for their express limited purposes. All possess substantial defects such that they have only limited economical and practical value for a system intended to provide an enhanced acquisition, recordal and communication system of data which would be both comprehensive and reliable in predicting an accurate and adequate cost of insurance for the vehicle. Since the type of operating information acquired and recorded in prior art systems was generally never intended to be used for determining the cost of vehicle insurance, the data elements that were monitored and recorded therein were not directly related to predetermined safety standards or the determining of an actuarial class for the vehicle operator. For example, recording data characteristics relevant to the vehicle's operating efficiency may be completely unrelated to the safety of operation of the vehicle. Further, there is the problem of recording and subsequently compiling the relevant data for an accurate determination of an actuarial profile and an appropriate insurance cost therefor.

Current motor vehicle control and operating systems comprise electronic systems readily adaptable for modification to obtain the desired types of information relevant to determination of the cost of insurance. Vehicle tracking systems have been suggested which use communication links with satellite navigation systems for providing information describing a vehicle's location based upon navigation signals. When such positioning information is combined with roadmaps in an expert system, vehicle location is ascertainable. Mere vehicle location, though, will not provide data particularly relevant to safety of operation unless the data is combined with other relevant data in an expert system which is capable of assessing whether the roads being driven are high-risk or low-risk with regard to vehicle safety.

On-line Web sites for marketing and selling goods have become common place. Many insurers offer communication services to customers via Web sites relevant to an insured profile and account status. Commonly assigned application U.S. Ser. No. 09/135,034, filed Aug. 17, 1998, now U.S. Pat. No. 6,064,970 discloses one such system. Customer comfort with such Web site communication has generated the need for systems which can provide even more useful information to customers relative to a customer's contract with the insurer. Such enhanced communications can be particularly useful to an insured when the subject of the communications relates to real time cost determination, or when the subject relates to prospective reoccurring insurable events wherein the system can relate in the existing insured's profile with some insurer provided estimates of a future event for deciding an estimated cost of insuring the event.

The present invention contemplates a new and improved monitoring, recording and communicating system for an insured unit of risk, which primarily overcomes the problem of determining cost of vehicle insurance based upon data which does not take into consideration how a specific unit of risk is operated. The subject invention will base insurance charges with regard to current material data representative of actual operating characteristics to provide a classification rating of an operator or the unit in an actuarial class which has a vastly reduced rating error over conventional insurance cost systems. Additionally, the present invention allows for frequent (monthly) adjustment to the cost of coverage because of the changes in operating behavior patterns. This can result in insurance charges that are readily controllable by individual operators. The system is adaptable to current electronic operating systems, tracking systems and communicating systems for the improved extraction of selected insurance related data. In addition, the system provides for enhanced and improved communication of the relevant acquired data, cost estimates of insuring events and customer insured profiles through an Internet/Web site.

BRIEF SUMMARY OF THE INVENTION

In accordance with the present invention, there is disclosed a method of determining a cost of automobile insurance based upon monitoring, recording and communicating data representative of operator and vehicle driving characteristics, whereby the cost is adjustable by relating the driving characteristics to predetermined safety standards. The method is comprised of steps of monitoring a plurality of raw data elements representative of an operating state of a vehicle or an action of the operator. Selected ones of the plurality of raw data elements are recorded when they are determined to have an identified relationship to the safety standards. The recorded elements are consolidated for processing against an insured profile and for identifying a surcharge or discount to be applied to a base cost of automobile insurance. The total cost of insurance obtained from combining the base cost and surcharges or discounts is produced as a final cost to the operator.

In accordance with another aspect of the present invention, the recording comprises identifying a trigger event associated with the raw data elements which has an identified relationship to the safety standards so that trigger information representative of the event is recorded.

In accordance with a more limited aspect of the present invention, the method comprises a step of immediately communicating to a central control station via an uplink, information representative of the trigger event and recording response information generated by the control station.

In accordance with yet another aspect of the present invention, the method comprises steps of generating calculated data elements and derived data elements from the raw data elements, and accumulating the calculated and derived data elements in a recording device.

In accordance with the present invention, there is provided a method and system for Internet on-line communicating, between an insurer and an insured, of detected operating characteristics of a unit of risk, (e.g., a vehicle) for a selected period, and the cost of insuring the unit for the selected period, as decided by the insurer in consideration of the detected operating characteristics. A Web site system is provided for selectively communicating the operating characteristics and the cost between the insurer and the insured. A monitoring system monitors the operating characteristics. A storage system stores the operating characteristics and is accessible to the Web site system. A processing system decides the cost of insuring the unit for a period based upon the operating characteristics monitored during that period. The processing system is also accessible to the Web site system.

One benefit obtained by use of the present invention is a system that will provide precise and timely information about the current operation of an insured motor vehicle that will enable an accurate determination of operating characteristics, including such features as miles driven, time of use and speed of the vehicle. This information can be used to establish actual usage based insurance charges, eliminating rating errors that are prevalent in traditional systems and will result in vehicle insurance charges that can be directly controlled by individual operators.

It is another benefit of the subject invention that conventional motor vehicle electronics are easily supplemented by system components comprising a data recording process, a navigation system and a communications device to extract selected insurance relevant data from the motor vehicle.

It is another object of the present invention to generate actuarial classes and operator profiles relative thereto based upon actual driving characteristics of the vehicle and driver, as represented by the monitored and recorded data elements for providing a more knowledgeable, enhanced insurance rating precision.

It is another aspect of the present invention that an on-line Web site is provided for communicating data, services, and estimates to customers via an Internet Web Site, including estimated costs for expected operating usage for a particular unit of risk. Accordingly, the real time cost determination and communication through the Web site provides the type of enhanced communications between a customer and an insurer that can be particularly useful in limiting costs, and enhancing safety.

It is another benefit of the invention that a user of a unit of risk may be authenticated as a proper user of the unit, and a more accurate rating for the authenticated user may be implemented for the computation of insurance costs.

The subject new insurance rating system retrospectively adjusts and prospectively sets premiums based on data derived from motor vehicle operational characteristics and driver behavior through the generation of new actuarial classes determined from such characteristics and behavior, which classes heretofore have been unknown in the insurance industry. The invention comprises an integrated system to extract via multiple sensors, screen, aggregate and apply for insurance rating purposes, data generated by the actual operation of the specific vehicle and the insured user/driver.

BRIEF DESCRIPTION OF THE DRAWINGS

The invention may take physical form in certain parts and steps and arrangements of parts and steps, the preferred embodiments of which will be described in detail in this specification and illustrated in the accompanying drawings which form a part hereof and wherein.

DETAILED DESCRIPTION OF THE PREFERRED EMBODIMENTS

Figure 1:
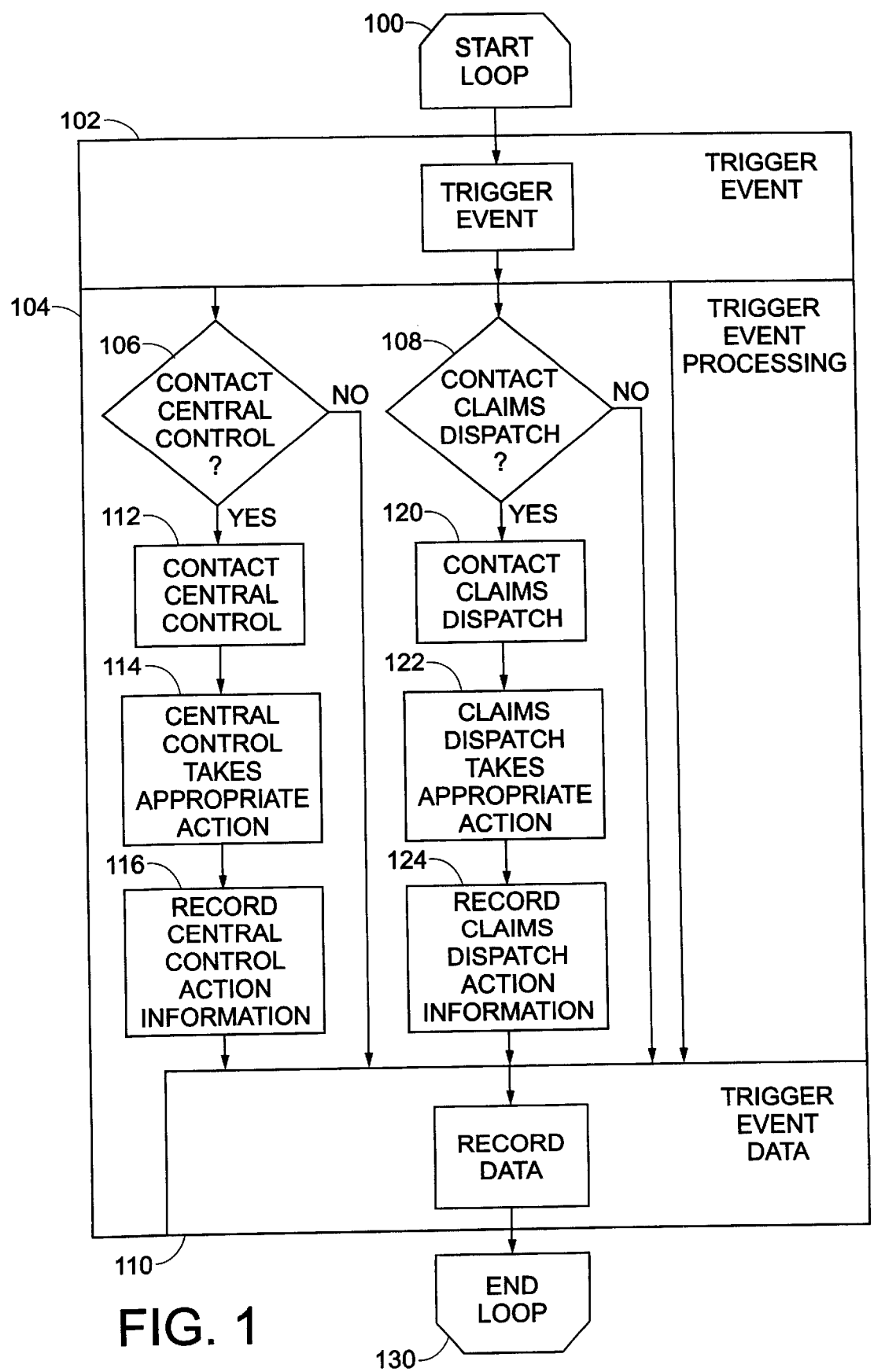
FIG. 1 is a block diagram/flowchart generally describing data capture methods within a unit of risk for insurance in claims processing.

The following terms and acronyms are used throughout the detailed description:

Internet. A collection of interconnected (public and/or private) networks that are linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

World Wide Web ("Web"). Used herein to refer generally to both (i) a distributed collection of interlined, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "progressive.com,"

and includes the content associated with a particular organization. As used herein, the term is generally intended to encompass both (i) the hardware/software server components that serve the informational content over the network, and (ii) the "back end" hardware/software components including any non-standard or specialized components, that interact with the server components to perform services for Web site users.

Figure 3:
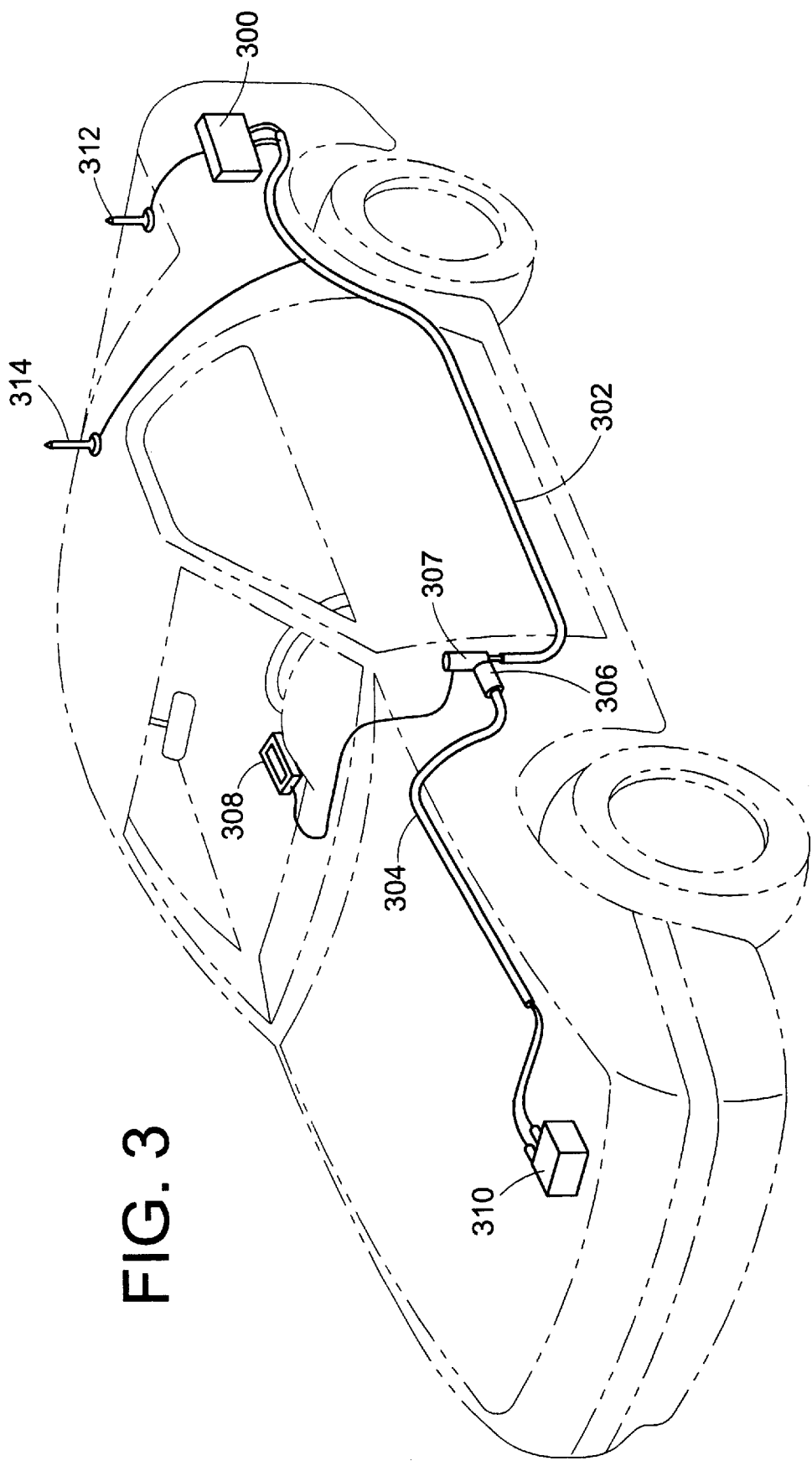
FIG. 3 is a suggestive perspective drawing of a vehicle including certain data elements monitoring, recording and communication devices.

Referring now to the drawings, wherein the showings are for purposes of illustrating the preferred embodiments of the invention only and not for purposes of limiting same, the FIGURES show an apparatus and method for monitoring, recording and communicating insurance related data for determination of an accurate cost of insurance based upon evidence relevant to the actual operation and in particular the relative safety of that operation. Generally, a unit of risk, e.g., vehicle, user is charged for insurance based upon statistical averages related to the safety of operation based upon the insurer's experience with other users who drive similar vehicles in a similar geographic area. The invention allows for the measure of the actual data while the motor vehicle is being driven. Such data measurement will allow the vehicle user to directly control his/her insurance costs by operating the vehicle in a manner which he/she will know will evidence superior safety of operation and a minimal risk of generation of an insurance claim. Examples of data which can be monitored and recorded include:

1. Actual miles driven;
2. Types of roads driven on (high risk vs. low risk); and,
3. Safe operation of the vehicle by the vehicle user through:
   A. speeds driven,
   B. safety equipment used, such as seat belt and turn signals,
   C. time of day driven (high congestion vs. low congestion),
   D. rate of acceleration,
   E. rate of braking,
   F. observation of traffic signs.
4. Driver identification With reference to FIG. 3, an exemplary motor vehicle is shown in which the necessary apparatus for implementing the subject invention is included. An on-board computer 300 monitors and records various sensors and operator actions to acquire the desired data for determining a fair cost of insurance. Although not shown therein, a plurality of operating sensors are associated with the motor vehicle to monitor a wide variety of raw data elements. Such data elements are communicated to the computer through a connections cable which is operatively connected to the vehicle data bus 304 through an SAE-J1978 connector, or OBD-II connector or other vehicle sensors 306. A driver input device 308 is also operatively connected to the computer 300 through connector 307 and cable 302. The computer is powered through the car battery 310, a conventional generator system, a battery or a solar based system (not shown). Tracking of the vehicle for location identification can be implemented by the computer 300 through navigation signals obtained from a GPS (global positioning system) antenna, a differential GPS or other locating system 312. The communications link to a central control station is accomplished through the cellular telephone, radio, satellite or other wireless communication system 314.

Figure 4:
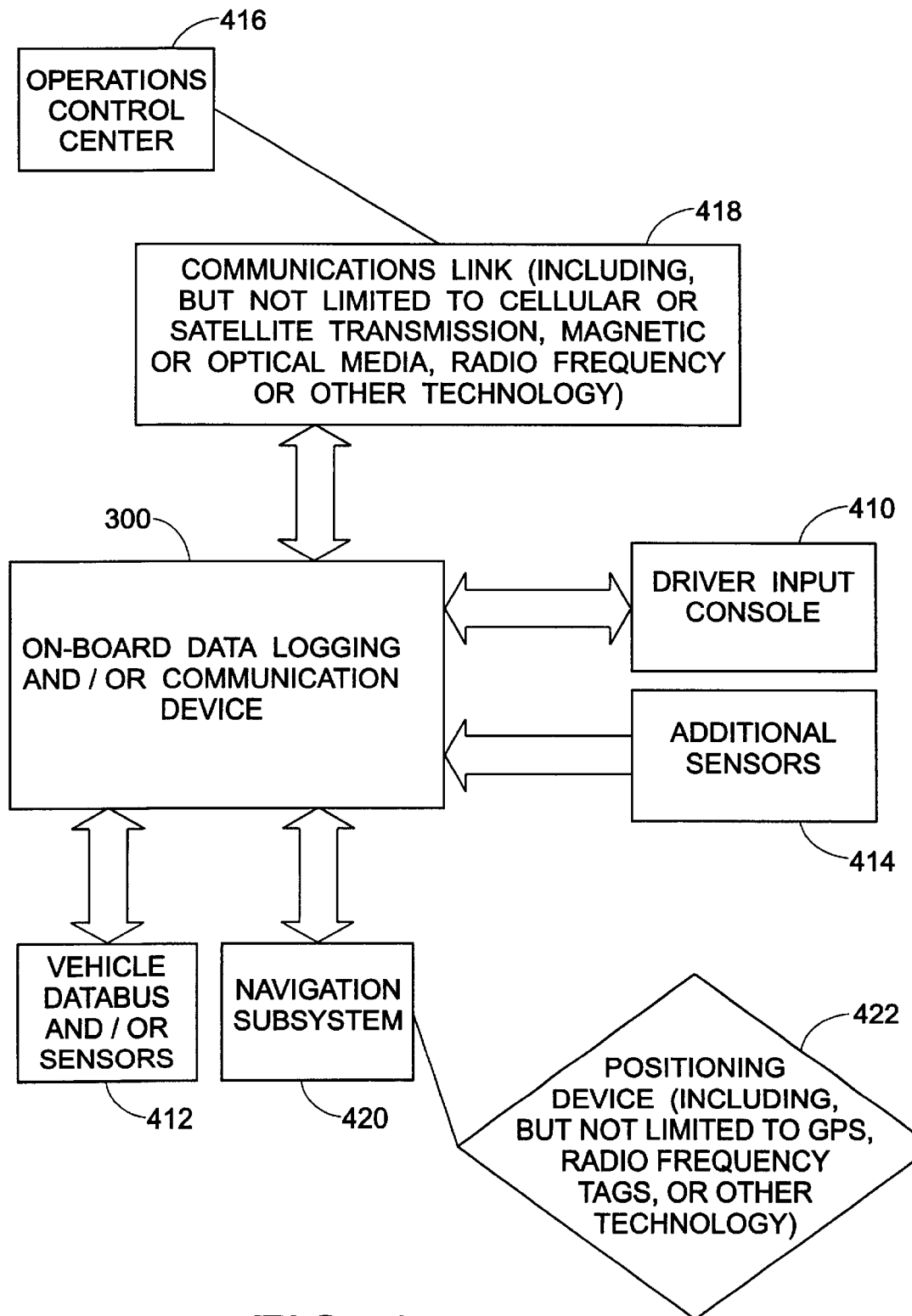
FIG. 4 is a block diagram of a vehicle onboard computer and recording system implementing the subject invention for selective communication with a central operations control center and a global positioning navigation system.

FIG. 4 provides the block diagram of the in-vehicle computer system. The computer 300 is comprised of several principal components, an on-board data storage device, an input/output subsystem for communicating to a variety of external devices, a central processing unit and memory device and a real time operating kernel for controlling the various processing steps of the computer 300. It is known that all of these functions can be included in a single dedicated microprocessor circuit 300. The computer 300 essentially communicates with a number of on-board vehicle devices for acquisition of information representative of various actual vehicle operating characteristics. A driver input console 410 allows the driver to input data representative of a need for assistance or for satisfaction of various threshold factors which need to be satisfied before the vehicle can be operated.

For example, a driver authentication system is intended, such as where several individual drivers (same family, etc.) may properly use the vehicle but each may have different ratings for insurance computations.

The physical operation of the vehicle is monitored through various sensors 412 in operative connection with the vehicle data bus, while additional sensors 414 not normally connected to the data bus can be in direct communication with the computer 300 as will hereinafter be more fully explained.

The vehicle is linked to an operation control center 416 by a communications link 418, preferably comprising a conventional cellular telephone interconnection, but also comprising satellite transmission, magnetic or optical media, radio frequency or other known communication technology. A navigation sub-system 420 receives radio navigation signals from a positioning device 422 which may include, but is not limited to GPS, radio frequency tags, or other known locating technology.

The type of elements monitored and recorded by the subject invention comprise raw data elements, calculated data elements and derived data elements. These can be broken down as follows:

Raw Data Elements:
  Power train sensors
    RPM,
    transmission setting (Park, Drive, Gear, Neutral),
    throttle position,
    engine coolant temperature,
    intake air temperature,
    barometric pressure,
  Electrical sensors
    brake light on,
    turn signal indicator,
    headlamps on,
    hazard lights on,
    back-up lights on,
    parking lights on,
    wipers on,
    doors locked,
    key in ignition,
    key in door lock,
    horn applied;
  Body sensors
    airbag deployment,
    ABS application,
    level of fuel in tank,
    brakes applied,
    radio station tuned in,
    seat belt on,
    door open,
    tail gate open,
    odometer reading,
    cruise control engaged, anti-theft disable,
occupant in seat,
occupant weight;
Other sensors
vehicle speed,
vehicle location,
date,
time,
vehicle direction,
IVHS data sources
pitch and roll,
relative distance to other objects.
Calculated Data Elements:
rapid deceleration;
rapid acceleration;
vehicle in skid;
wheels in spin;
closing speed on vehicle in front;
closing speed of vehicle in rear;
closing speed of vehicle to side (right or left);
space to side of vehicle occupied;
space to rear of vehicle occupied;
space to front of vehicle occupied;
lateral acceleration;
sudden rotation of vehicle;
sudden loss of tire pressure;
driver identification (through voice recognition or code or fingerprint recognition);
distance traveled; and
environmental hazard conditions (e.g. icing, etc.).
Derived Data Elements:
vehicle speed in excess of speed limit;
observation of traffic signals and signs;
road conditions;
traffic conditions; and
vehicle position.

This list includes many, but not all, potential data elements.

With particular reference to FIG. 1, a flowchart generally illustrating the data capture process of the subject invention within the vehicle for insurance and claims processing, is illustrated. Such a process can be implemented with conventional computer programming in the real time operating kernel of the computer 300. Although it is within the scope of the invention that each consumer could employ a unique logic associated with that consumer's unit of risk, based on the underwriting and rating determination (FIG. 6), as will be more fully explained later, FIG. 1 illustrates how the data capture within a particular consumer logic is accomplished. After the system is started 100, data capture is initiated by a trigger event 102 which can include, but is not limited to:

Ignition On/Off
Airbag Deployment
Acceleration Threshold
Velocity Threshold
Elapsed Time
Battery Voltage Level
System Health
User Activation/Panic Button
Traction
Location/Geofencing
Driver Identification
Remote Activation Trigger event processing 104 essentially comprises three elements, a flow process for contacting a central control 106, contacting a claims dispatch, and/or recording trigger event data 110. If the trigger event is one that does not require contacting central control or contacting a claims dispatch, then processing proceeds to merely record the event as trigger event data 110. Trigger event processing can include, but is not limited to:

Contact External Entities
EMT (Emergency Medical Transport), claims Dispatch, Other External Entity Takes Appropriate Action
Record Sensor Information
Transmission of Data
Recalibration
Load Software If trigger event processing comprises contact central control, the inquiry is made, and if affirmative, the central control is contacted 112, the central control can take appropriate action 114, and a record is made of the action taken by the central control 116. For the process of claims dispatch 108, the system first contacts 120 the claims dispatch service department of the insurer, the claims dispatch takes appropriate action 122 and a recording 124 of the claims dispatch action information is made.

The recording of trigger event data can include, but is not limited to:

The Trigger
Latitude
Longitude
Greenwich Mean Time
Velocity
Acceleration
Direction
Vehicle Orientation
Seatbelt Status Data capture processing concludes with end step 130.

The recording thus comprises monitoring a plurality of raw data elements, calculated data elements and derived data elements as identified above. Each of these is representative of an operating state of the vehicle or an action of the operator. Select ones of the plurality of data elements are recorded when the ones are determined to have an identified relationship to the safety standards. For example, vehicle speed in excess of a predetermined speed limit will need to be recorded but speeds below the limit need only be monitored and stored on a periodic basis. The recording may be made in combination with date, time and location. Other examples of data needed to be recorded are excessive rates of acceleration or frequent hard braking.

The recording process would be practically implemented by monitoring and storing the data in a buffer for a selected period of time, e.g., thirty seconds. Periodically, such as every two minutes, the status of all monitored sensors for the data elements is written to a file which is stored in the vehicle data storage within the computer 300. The raw, calculated and derived data elements listed above comprise some of the data elements to be so stored.

"Trigger events" should be appreciated as a combination of sensor data possibly requiring additional action or which may result in a surcharge or discount during the insurance billing process. Certain trigger events may require immediate upload 106 to a central control which will then be required to take appropriate action 114. For example, a trigger event would be rapid deceleration in combination with airbag deployment indicating a collision, in which case the system could notify the central control of the vehicle location. Alternatively, if the operator were to trigger on an emergency light, similarly the system could notify the central control of the vehicle location indicating that an emergency is occurring.

Trigger events are divided into two groups: those requiring immediate action and those not requiring immediate action, but necessary for proper billing of insurance. Those required for proper billing of insurance will be recorded in the same file with all the other recorded vehicle sensor information. Those trigger events requiring action will be uploaded to a central control center which can take action depending on the trigger event. Some trigger events will require dispatch of emergency services, such as police or EMS, and others will require the dispatch of claims representatives from the insurance company.

The following comprises an exemplary of some, but not all, trigger events:

Need for Assistance:
These events would require immediate notification of the central control center.
1. Accident Occurrence. An accident could be determined through the use of a single sensor, such as the deployment of an airbag. It could also be determined through the combination of sensors, such as a sudden deceleration of the vehicle without the application of the brakes.
2. Roadside assistance needed. This could be through the pressing of a "panic button" in the vehicle or through the reading of a sensor, such as the level of fuel in the tank. Another example would be loss of tire pressure, signifying a flat tire.
3. Lock-out assistance needed. The reading of a combination of sensors would indicate that the doors are locked but the keys are in the ignition and the driver has exited the vehicle.
4. Driving restrictions. The insured can identify circumstances in which he/she wants to be notified of driving within restricted areas, and warned when he/she is entering a dangerous area. This could be applied to youthful drivers where the parent wants to restrict time or place of driving, and have a record thereof.

Unsafe Operation of the Vehicle
These events would be recorded in the in-vehicle recording device for future upload. Constant trigger events would result in notification of the driver of the exceptions.
1. Excessive speed. The reading of the vehicle speed sensors would indicate the vehicle is exceeding the speed limit. Time would also be measured to determine if the behavior is prolonged.
2. Presence of alcohol. Using an air content analyzer or breath analyzer, the level of alcohol and its use by the driver could be determined.
3. Non-use of seatbelt. Percent of sample of this sensor could result in additional discount for high use or surcharge for low or no use.
4. Non-use of turn signals. Low use could result in surcharge.
5. ABS application without an accident. High use could indicate unsafe driving and be subject to a surcharge.

Figure 2:
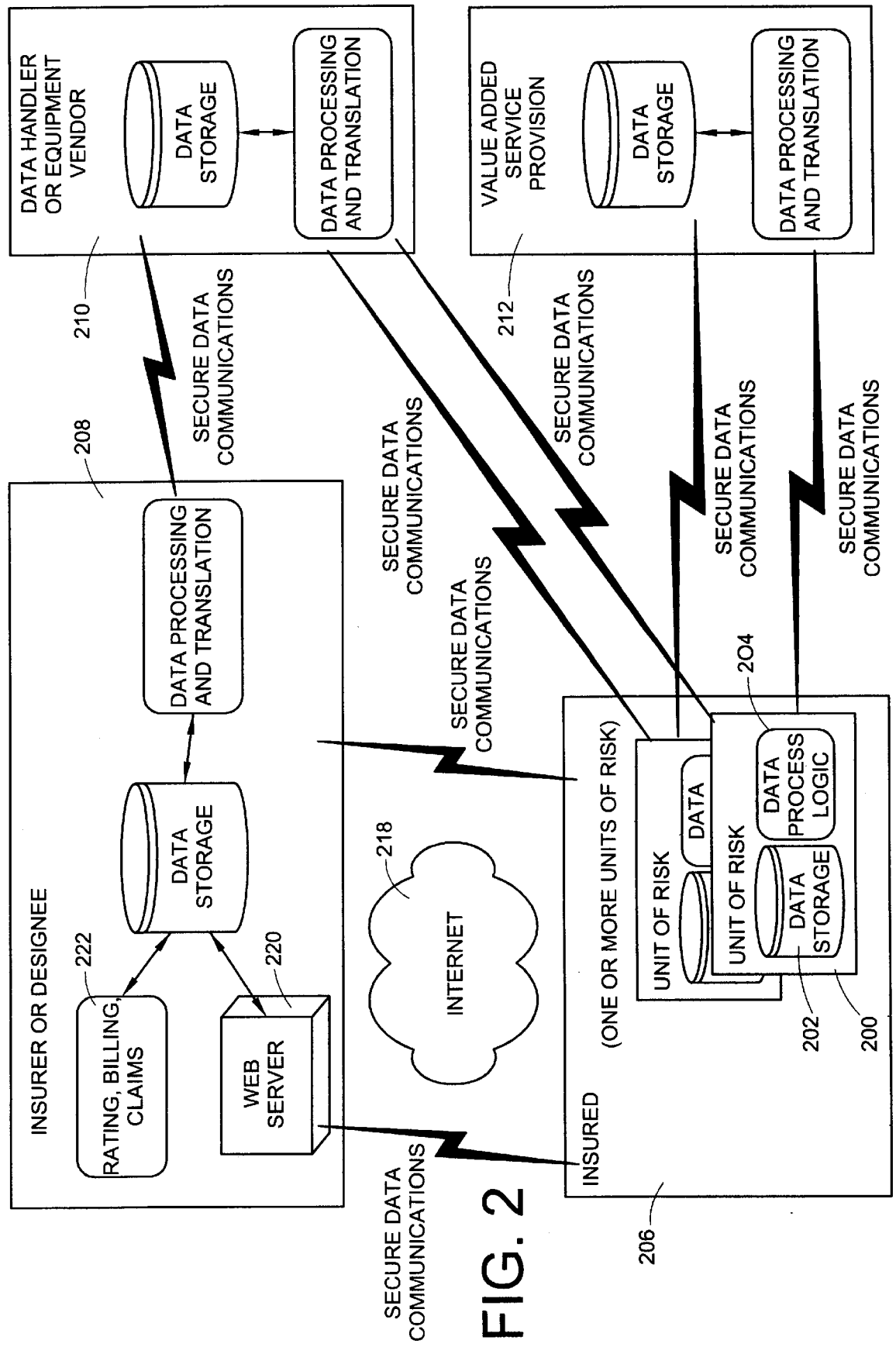
FIG. 2 is a block diagram generally illustrated in the communication network design the unit of risk including a response center of the insurer and a data handling center.

With particular reference to FIG. 2, a general block diagram/flowchart of the network design for gathering appropriate information for insurance billing on a periodic basis is illustrated. Each unit of risk 200, which as noted above, can just as easily be an airplane or boat, as well as a automobile, includes the data storage 202 and data process logic 204 as described more in detail in FIG. 4. The insured 206 responsible for each unit of risk communicates within the insuring entity 208 or its designee (by "designee" is meant someone acting for the insurer, such as a dedicated data collection agent, data handler or equipment vendor 210 and/or a value added service provider 212.) The data handler can be a third party entity verifying that the operating equipment of the system is in proper working order, and as such, will usually be a subcontractor to the insurer. A value added service provider is another third party entity, such as a directional assistance service, or telephone service provider, also part from the insurer, whose communications with the units of risk may be important or useable to the insurance computation algorithms.

Another important feature of FIG. 2 is that the insured 206 may not only communicate with the insurer 208 through the communications link 418 (FIG. 4), but also through an Internet 218 communications path. Such communication will occur through a Webserver 220 and the insurer's Web site so that an insured 206 may get on-line with the insurer 208 to observe and verify recorded data, claims processing, rating and billing 222, as well as acquire improved insurance cost estimations, as will hereinafter be more fully explained.

Figure 5:
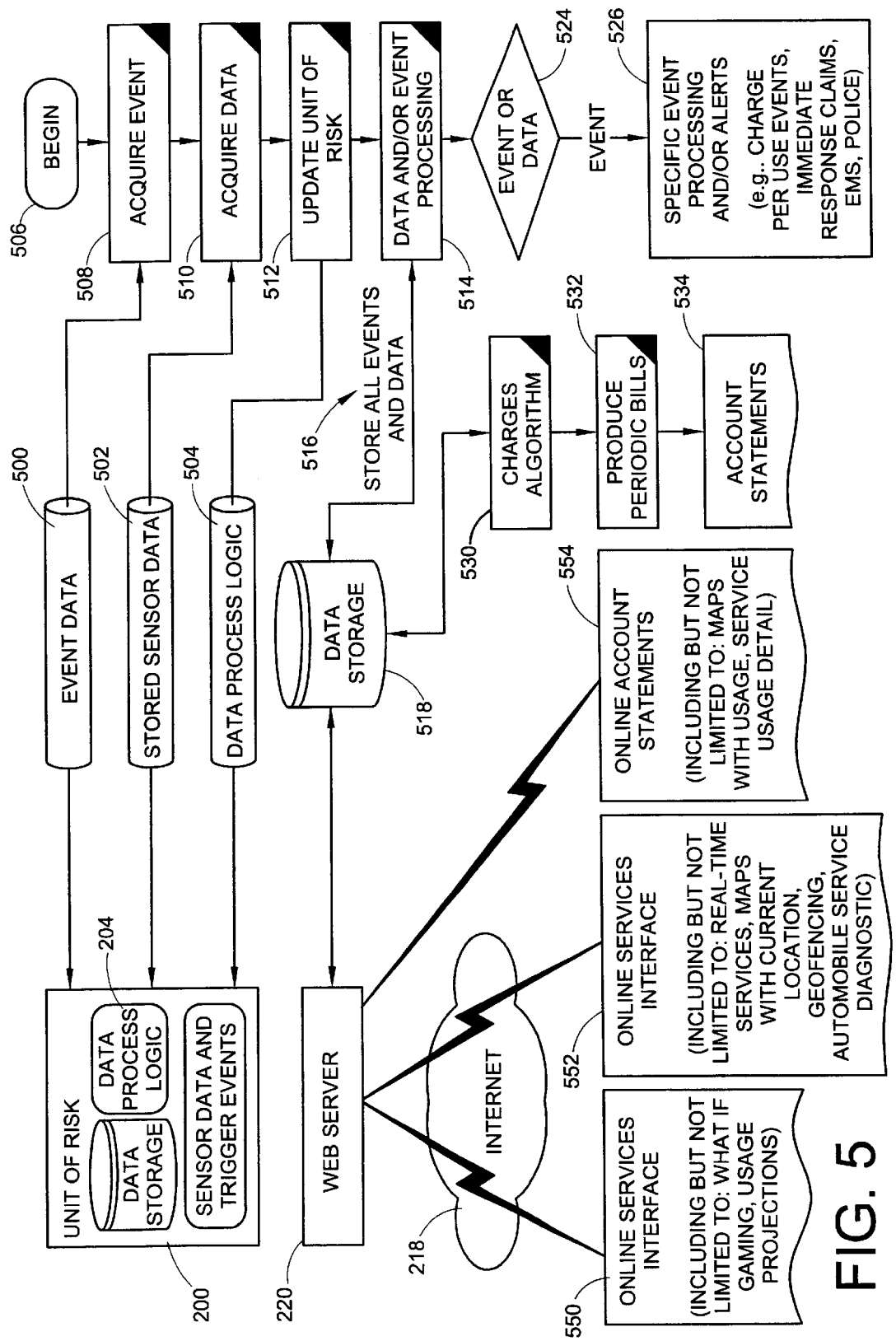
FIG. 5 is a block diagram illustrating use of acquired data including communication through Internet access; and, FIG. 6 is a block diagram/flowchart illustrating an underwriting and rating method for determining a cost of insurance in conjunction with the system of FIG. 4.

With particular reference to FIG. 5, a more detailed description of system use of data acquired from the unit of risk is explained with particular attention to advantageous Internet communications. The unit of risk 200 is primarily concerned with transferring three classes of data between it and the insurer. The event data 500 and stored sensor data 502 have been discussed with reference to FIG. 1. Data process logic 504 is particular processing logic that can be transferred from the insurer to the unit of risk that is adapted for acquiring data especially important for assessing the particular unit's insurance costs. For example, if a particular unit has a special need for providing information about brake pedal application, special data process logic will be provided to that unit to store data related to this activity. On the other hand, for many other units such data may not be necessary and so the unit may operate with standard data process logic 204. The important feature of special data process logic 504 is that the data process logic 204 for a unit of risk can be regularly updated as either the insured, the insurer or events warrant. One easily foreseeable special data process logic would be related to breathalyser analysis.

The process flowchart starting at Begin 506 more generally describes the communication activity between the insurer and the unit of risk. The insurer will acquire event data 508, sensor data 510, may update 512 the data process logic and then process 514 the raw data elements to generate either the calculated or derived data elements. All relevant data is stored 516 in a conventional data storage device 518. If the stored item is an event 524, then the insurer needs to cause some sort of response to the event. For example, if there is an airbag deployment, the insurer may actually try to communicate with the vehicle, and upon failure of communication, may initiate deployment of emergency medical or police service. If this specific event processing and/or alerts 526 occurs, the system may have to initiate a charge per use event. For instance, charges can also include immediate response claims, EMS contact charges or police dispatch charges. The data or events which are stored in stored device 518 are accessed by a billing algorithm 530 to generate a cost for the unit of risk in consideration of all the relevant data and events occurring in that period. It is a special feature of the subject invention that the cost of insurance is based upon the real time data occurring contemporaneously with the billing so that the system provides an insurance use cost, as opposed to an estimation based upon historical data. After a relevant cost is computed, periodic bills are produced 532 and typically mailed to a customer as an account statement 534.

Another important feature of the subject invention illustrated in FIG. 5 is that the insurer provides a Webserver 220 to allow a customer to access via Internet 218 communication, the relevant sensor data and event data associated with the customer.

Two different types of on-line services interfaces are illustrated; a prospective on-line services interface 550, or an interface 552 for reporting acquired data. The data reports through the acquired service interface may comprise all of the stored event and sensor data, along with enhanced processing maps showing travel routes during the billing period, or even a map showing current location of the unit of risk. By Geofencing is meant to identify when the unit travels outside of a certain geographical area. It is even possible to determine whether automobile maintenance service is appropriate by diagnostic analysis of the sensor and event data.

The prospective interface relates to "what if" gaming where a customer can project certain usages of the unit of risk, and the system can, in combination with similar occurring usage in the past or, based upon the overall customer profile or matrix, project a estimated cost for such usage. In effect, a user can determine in advance what particular usage of the unit will incur as insurance cost with a very reliable associated insurance estimate.

Lastly, enhanced on-line account statements 554 can also be communicated on-line wherein maps with usage, or service usage details can be provided as a more detailed explanation of the resulting costs of an account statement.

Figure 6:
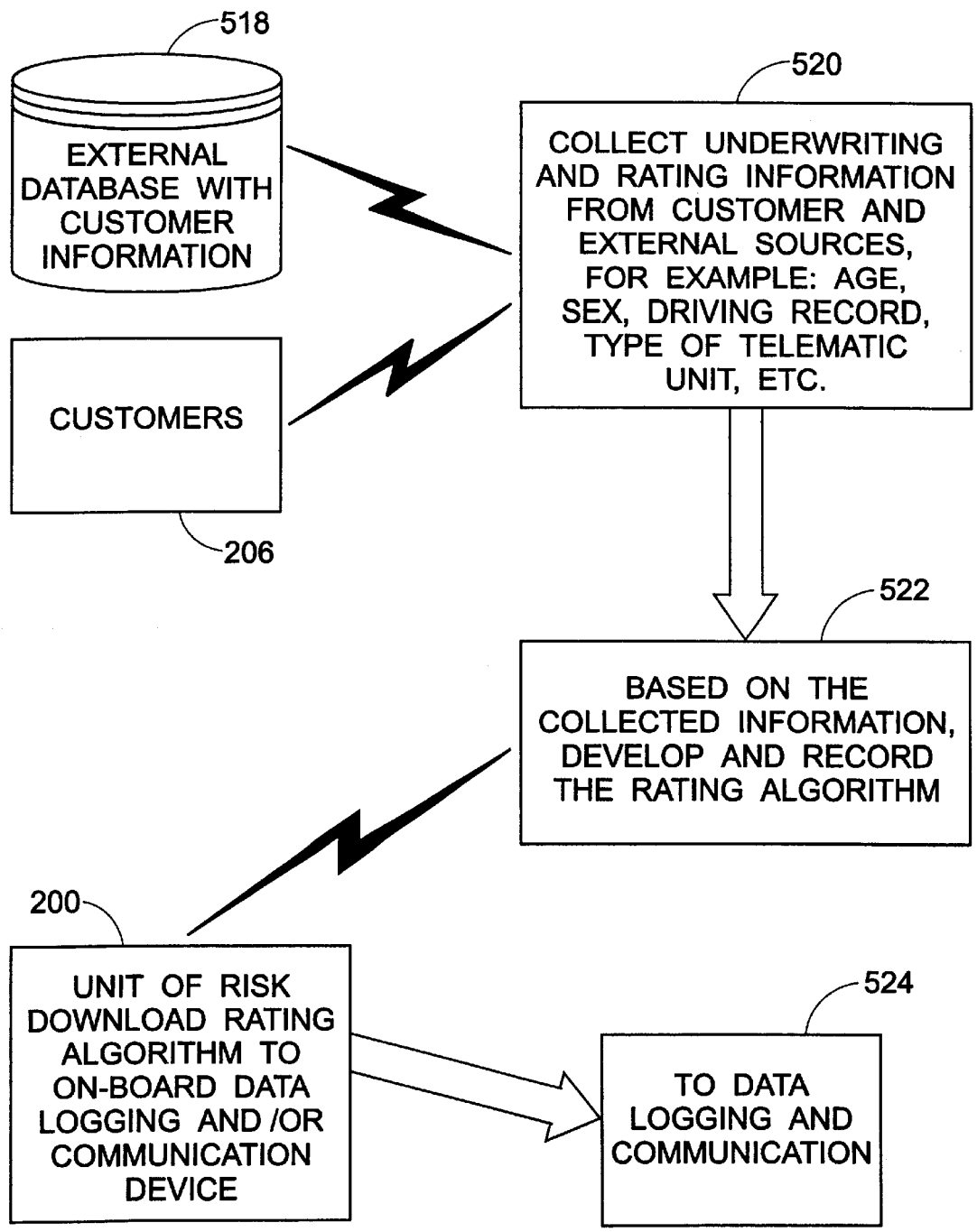

With particular reference to FIG. 6, the subject invention is particularly useful for generating improved rating algorithms due to the improved acquisition and amount of relative data for assessing insurance costs for a unit of risk. In the manner as discussed above, the database 518 has the benefit of the data from a plurality of customers 206. An insurer can over time use the accumulated underwriting and rating information from individual customers 520 to develop improved rating algorithms 522. Such improved algorithms can be regularly communicated to the units of risk 200 for improved insurance cost computation accuracies. The improved rating algorithms can be communicated 524 to the units of risk on-board computer 300 (FIG. 4).

The subject invention is also applicable as a process for collecting data to be used for the following non-insurance related purposes: advertising and marketing, site selection, transportation services, land use planning, determining road design, surface or composition, traffic planning and design, and road conditions.

The invention has been described with reference to the preferred embodiments. Obviously modifications and alterations will occur to others upon a reading and understanding of this specification. The present invention is intended to include all such modifications and alterations in so far as they come within the scope of the appended claims or equivalents thereof.

Having thus described the invention, we now claim:

1. A method of communicating a cost of insuring a unit of risk and corresponding operating characteristics for the unit monitored for a selected period, comprising steps of:

providing a Web site system for communicating data between an insurer and an insured relative to the unit of risk;

monitoring the operating characteristics during the selected period;

deciding the cost of insuring for the period based upon the operating characteristics monitored in that period; and selectively communicating the monitored operating characteristics and decided cost to the insured through the Web site system.

2. The method as defined in claim 1 wherein the selected period comprises a real time period for operating the unit of risk.

3. The method as defined in claim 1 wherein the selected period comprises a prospective period for operating the unit of risk, the operating characteristics comprise estimated operating characteristics suggested by the insured, and the decided cost of insuring comprises an estimated cost for the estimated operating characteristics.

4. The method as defined in claim 3 wherein the estimated operating characteristics selectively comprise a destination, a travel route, a time of travel or an operator identity for the unit of risk.

5. The method as defined in claim 1 further including generating an operating profile for the unit of risk from the monitored operating characteristics.

6. The method as defined in claim 5 further including identifying an operator as the unit of risk.

7. The method as defined in claim 5 further including identifying an equipment item as the unit of risk.

8. The method as defined in claim 1 further including providing selectively available value added services including telephone services, positioning services and diagnostic services to the unit of risk or operator.

9. The method as defined in claim 8 further including considering the value added services for the deciding of the cost of insurance.

10. A system for Internet on-line communicating between an insurer and insured, of detected operating characteristics of a unit of risk for a selected period, and a cost of insuring the unit for the selected period, as decided by the insurer in consideration of the detected operating characteristics, the system comprising:

a Web site system for selectively communicating the operating characteristics and the cost from the insurer to the insured;

a monitoring system for monitoring the operating characteristics;

a storage system for storing the operating characteristics, the storage system being accessible to the Web site system; and, a processing system for deciding the cost of insuring the unit for the period based upon the monitored operating characteristics, the processing system being accessible to the Web site system.

11. The system as defined in claim 10 wherein the selected period comprises a real time period for operating the unit of risk.

12. The system as defined in claim 10 wherein the selected period comprises a prospective period for operating the unit of risk, the operating characteristics comprise estimated operating characteristics suggested by the insured, and the decided cost of insuring comprises an estimated cost for the estimated operating characteristics.

13. The system as defined in claim 10 wherein the unit of risk comprises an operator.

14. The system as defined in claim 10 wherein the unit of risk comprises an equipment item.

15. The system as defined in claim 10 including an on-line service interface providing an item from a group comprising usage projection estimates, maps, geofencing and automobile service diagnostics.

16. The system as defined in claim 10 including an on-line account statement interface providing cost information for the unit of risk and further selectively providing maps indicating unit usage, and service usage detail of the unit of risk.

17. The system as defined in claim 10 including a user identification system for authenticating an operator of the unit of risk and wherein the identification of the user corresponds to an associated insurance rating for the user.

* * * * *